US012175956B2

(12) United States Patent
Kasuga

(10) Patent No.: US 12,175,956 B2
(45) Date of Patent: Dec. 24, 2024

(54) MUSICAL SOUND SIGNAL GENERATION DEVICE, MUSICAL SOUND SIGNAL GENERATION METHOD, AND NON-TRANSITORY COMPUTER-READABLE RECORDING MEDIUM

(71) Applicant: CASIO COMPUTER CO., LTD., Tokyo (JP)

(72) Inventor: Kazutaka Kasuga, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 296 days.

(21) Appl. No.: 17/944,970

(22) Filed: Sep. 14, 2022

(65) Prior Publication Data

US 2023/0103520 A1 Apr. 6, 2023

(30) Foreign Application Priority Data

Sep. 21, 2021 (JP) ................................ 2021-153006
Jun. 17, 2022 (JP) ................................ 2022-098190

(51) Int. Cl.
*G10H 1/057* (2006.01)

(52) U.S. Cl.
CPC ....... *G10H 1/057* (2013.01); *G10H 2210/265* (2013.01); *G10H 2250/025* (2013.01); *G10H 2250/051* (2013.01); *G10H 2250/061* (2013.01); *G10H 2250/101* (2013.01)

(58) Field of Classification Search
CPC ......................... G10H 1/057; G10H 2210/265
See application file for complete search history.

(56) References Cited

U.S. PATENT DOCUMENTS

| | | | | | |
|---|---|---|---|---|---|
| 5,157,214 | A * | 10/1992 | Nakanishi | G10H 5/007 | 84/630 |
| 5,432,296 | A * | 7/1995 | Takeuchi | G10H 5/007 | 84/661 |
| 5,432,856 | A * | 7/1995 | Shioda | G10H 1/057 | 381/63 |
| 8,345,887 | B1 * | 1/2013 | Betbeder | G10H 1/0091 | 381/20 |
| 2004/0213416 | A1 * | 10/2004 | Dahl | G10K 15/12 | 381/63 |
| 2023/0103520 | A1 * | 4/2023 | Kasuga | G10H 7/008 | 84/371 |

FOREIGN PATENT DOCUMENTS

JP H06348277 A 12/1994

* cited by examiner

*Primary Examiner* — Robert W Horn
(74) *Attorney, Agent, or Firm* — Holtz, Holtz & Volek PC

(57) ABSTRACT

A musical sound signal generation device continuously connects any one of a connected zeroth delay unit and a connected second delay unit to a fractional delay block and connects at least any one of a new zeroth delay unit and a new second delay unit to at least any one of the fractional delay block other than the fractional delay block connected to a new first delay unit in response to setting any one of the connected zeroth delay unit and the connected second delay unit as the new first delay unit, setting a delay unit in a preceding stage of the new first delay unit as the new zeroth delay unit, and setting a delay unit in a subsequent stage of the new first delay unit as the new second delay unit in accordance with a change in a designated tone pitch.

16 Claims, 11 Drawing Sheets

MUSICAL SOUND SIGNAL GENERATION DEVICE, MUSICAL SOUND SIGNAL GENERATION METHOD, AND NON-TRANSITORY COMPUTER-READABLE RECORDING MEDIUM

REFERENCE TO RELATED APPLICATION

The present application claims the benefit of priority of Japanese Patent Application No. 2021-153006 filed on Sep. 21, 2021 and Japanese Patent Application No. 2022-98190 filed on Jun. 17, 2022, the entire contents of Japanese Patent Application No. 2021-153006 and Japanese Patent Application No. 2022-98190 are incorporated herein by reference.

BACKGROUND

1. Technical Field

The present disclosure relates to a musical sound signal generation device, a musical sound signal generation method, and a non-transitory computer-readable recording medium storing a program.

2. Related Art

The number of delay units constituting a wave guide modeling sound source is an integer and is discrete. Therefore, a technique for achieving a delay length of a fraction finer than the integer corresponding to the number of delay units is required in order to determine a strict frequency.

As a related art for continuously achieving fractional delay lengths in a wide frequency band, for example, there is known a technique of inserting an all-pass filter before a final stage of a delay unit in JP H6-348277 A. This technique achieves a musical sound signal synthesis device including: a first all-pass filter APF1; a second all-pass filter APF2; a variable connection means for connecting the first and second all-pass filters to selected different stages of delay elements; a control means for controlling the all-pass filters and the variable connection means such that delay times become equal in outputs of the first and second all-pass filters; and a weighted addition means for performing weighted addition of the outputs of the first and second all-pass filters. In this related art, it is possible to prevent a decrease in amplitude in a high frequency band by using the all-pass filter. In addition, in this related art, a fractional delay length is generated by the weighted addition of the two all-pass filters to suppress generation of noise due to discontinuous transition of a coefficient of the all-pass filter between 0.0 and 1.0 when a tone pitch frequency changes with time and an integer delay length in a wave guide modeling sound source is switched with a lapse of time, such as at the time of pitch bend.

SUMMARY

In the above-described related art, however, it is necessary to operate the two all-pass filters such that the delay times are always equal and to perform the weighted addition of the outputs of the two all-pass filters. Thus, an operation of constantly multiplying a filter coefficient twice is executed in each calculation of the two all-pass filters, and a multiplication operation in the weighted addition is also required, so that a total of at least six multiplication operations are required per sample. In a case where, for example, 256 polyphonic sounds are simultaneously generated using such a technique of the wave guide modeling sound source with a large number of multiplication operations (for example, in the case of a modeling sound source of a piano), it is necessary to perform multiplication operations, for example, at least 6 times×256 polyphonic sounds=1,536 times of multiplication operations in total per sample, and there is a problem that the amount of calculation for musical sound generation increases as a whole.

Therefore, one advantage of the present disclosure is to generate a musical sound with a small amount of calculation.

A musical sound signal generation device continuously connects any one of a connected zeroth delay unit and a connected second delay unit to a fractional delay block and connects at least any one of a new zeroth delay unit and a new second delay unit to at least any one of the fractional delay block other than the fractional delay block connected to a new first delay unit in response to setting any one of the connected zeroth delay unit and the connected second delay unit as the new first delay unit, setting a delay unit in a preceding stage of the new first delay unit as the new zeroth delay unit, and setting a delay unit in a subsequent stage of the new first delay unit as the new second delay unit in accordance with a change in a designated tone pitch.

DETAILED DESCRIPTION

Figure 1:
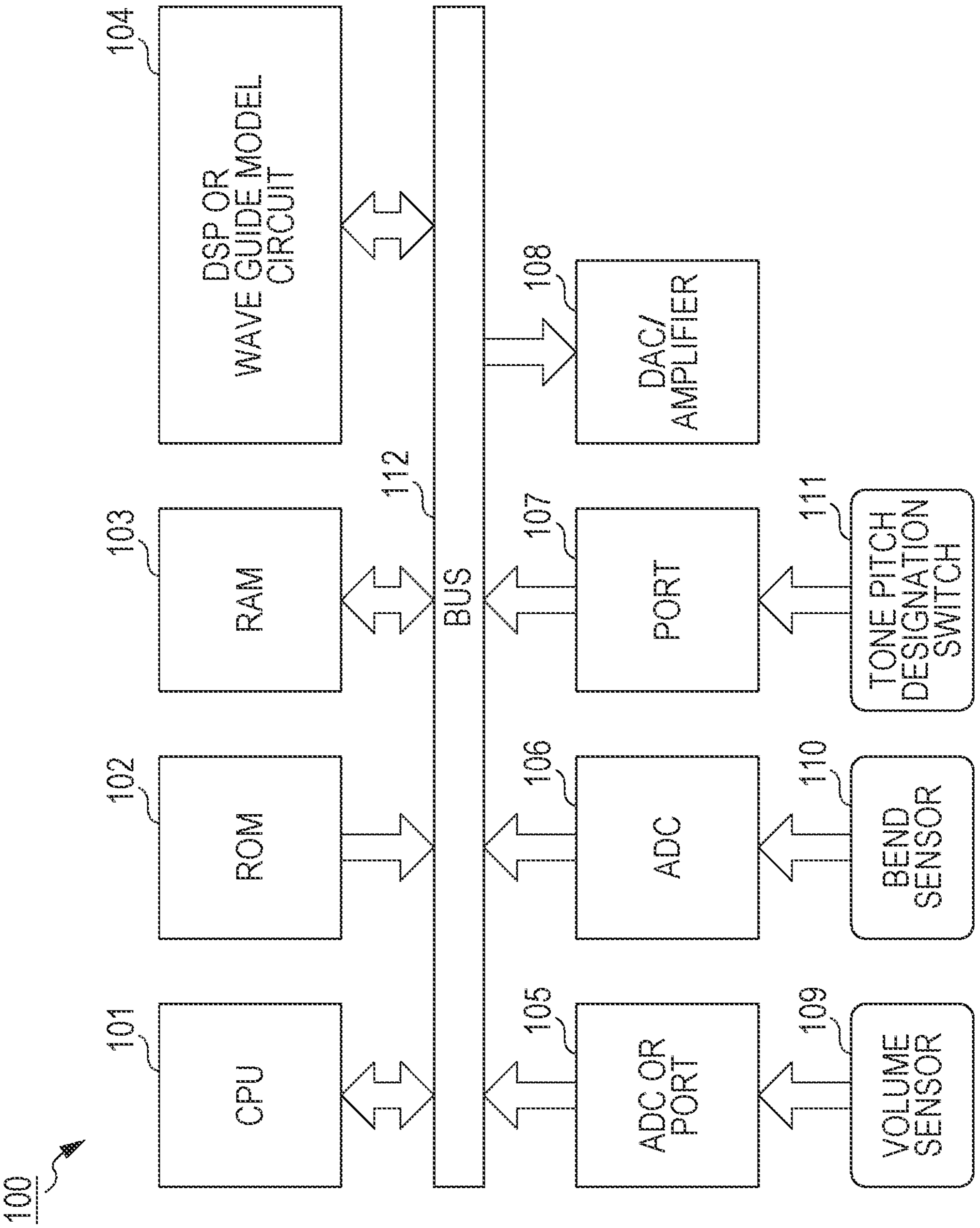
FIG. 1 is a block diagram illustrating exemplary hardware of an embodiment of a musical sound signal generation device according to the present disclosure.

Hereinafter, modes for carrying out the present disclosure will be described in detail with reference to the drawings. An electronic device includes a musical sound signal generation device 100, a performance operator (not illustrated), and a speaker. The performance operator corresponds to a key when the electronic device is a keyboard, such as an electronic piano, and corresponds to a mouthpiece when the electronic device is an electronic wind instrument. FIG. 1 is a block diagram illustrating exemplary hardware of an embodiment of the musical sound signal generation device 100 according to the present disclosure. The musical sound signal generation device 100 includes: at least one central processing unit (CPU) 101 as a processor; a read only memory (ROM) 102; a random access memory (RAM) 103; a digital signal processor (DSP) or a wave guide model circuit 104; a pitch bend sensor 110 and an analog-to-digital converter (ADC) 106 to which an output of the pitch bend sensor 110 is connected; a volume sensor 109 and an ADC or a digital input port 105 configured to detect the volume sensor 109; a tone pitch designation switch 111 and a digital input port 107 to which an output of the tone pitch designation switch is connected; a digital-to-analog converter (DAC)/amplifier 108; and a system bus 112. The CPU 101, the ROM 102, the RAM 103, the DSP or wave guide model circuit 104, the ADC 106, the ADC or digital input port 105, the digital input port 107, and the DAC/amplifier 108 are connected to each other by the system bus 112. Here, the volume sensor 109 and the tone pitch designation switch 111 may be the same. For example, in a case where the musical sound signal generation device 100 is an electronic piano, a switch sensing that a key has been pushed serves as both a tone pitch sensor and a volume sensor.

Figure 2:
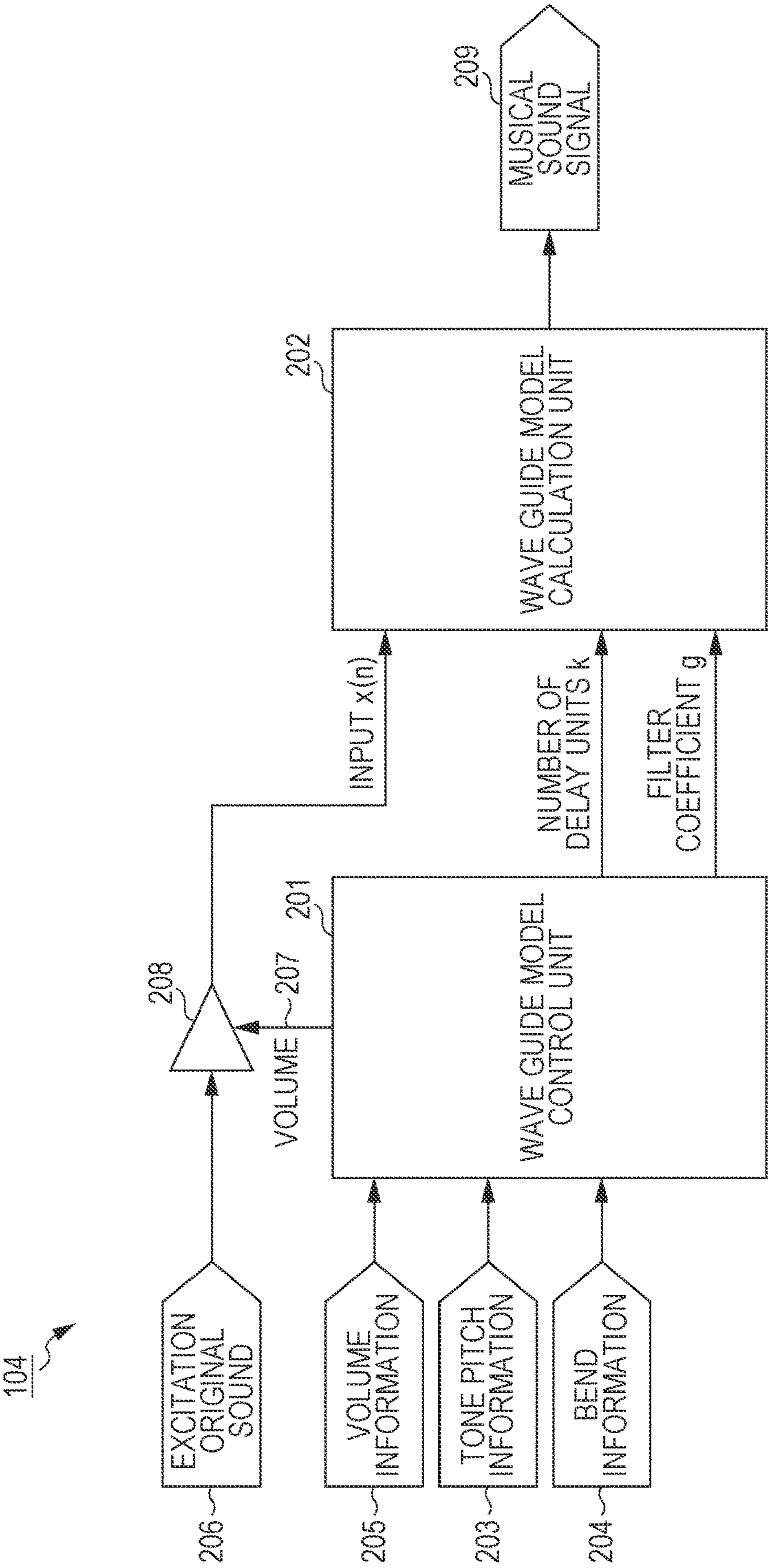
FIG. 2 is a block diagram illustrating exemplary functions implemented by a digital signal processor (DSP) or a wave guide model circuit.

In the present embodiment, an example of using the CPU 101 and the DSP 104 is described as an embodiment in which the present disclosure is implemented as software. However, the CPU 101 may play the role of the DSP 104. In addition, the function of the DSP 104 may be implemented by the hardware wave guide model circuit 104. FIG. 2 is a block diagram illustrating exemplary functions implemented by the DSP or wave guide model circuit 104.

A wave guide model control unit 201, which is a control circuit, receives tone pitch information 203 (for example, a note number depending on a key in the case of the electronic piano) input from the tone pitch designation switch 111 in FIG. 1 and bend information (pitch change amount) 204 transmitted from the pitch bend sensor 110 in FIG. 1 as input signals, calculates a delay length of a wave guide model corresponding to a frequency f at which a sound needs to be generated, calculates the number of delay units k that is an integer part of the delay length and a filter coefficient g of an all-pass filter (fractional delay block) that determines a fractional part 1 of the delay length, and outputs the calculated number of delay units k and the calculated filter coefficient g to a wave guide model calculation unit 202.

Here, it is known that there is a relationship of $$g=(1-1)/(1+1) \quad (1)$$

between the fractional part 1 of the delay length and the filter coefficient g of the all-pass filter.

In addition, the wave guide model control unit 201 calculates a volume 207 of an excitation original sound 206 on the basis of volume information 205 input from the volume sensor 109 in FIG. 1. Then, the excitation original sound 206 is multiplied by the volume 207 by a multiplier 208. Here, the excitation original sound 206 is a signal that serves as a source of resonance in wave guide modeling and is a signal that is recorded in advance and stored in, for example, the ROM 102 in FIG. 1, is copied from the ROM 102 to the RAM 103 in response to an activation of a system, and is read from the RAM 103 in response to a start of sound generation control, or is a signal synthesized by calculation.

The wave guide model calculation unit 202 receives the excitation original sound 206 multiplied by the volume 207 as an input signal x(n) and the delay length (the number of delay units k and the filter coefficient g), performs calculation to be described later with reference to FIG. 3, and outputs a musical sound signal 209. The musical sound signal 209 is input to the DAC/amplifier 108 in FIG. 1 and emitted via a speaker or the like of an electronic device (electronic musical instrument).

Figure 3:
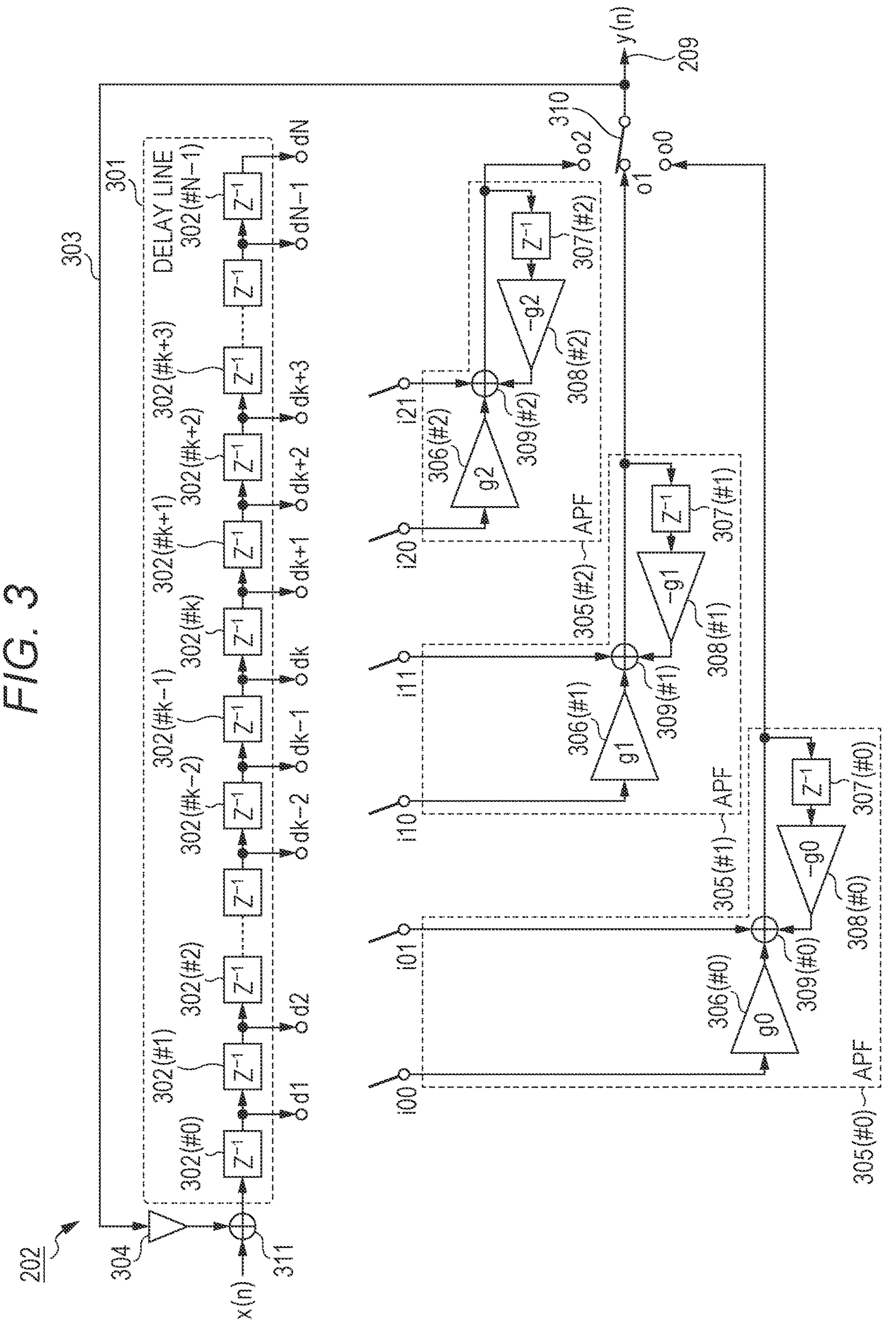
FIG. 3 is a diagram illustrating an exemplary block configuration of a wave guide model calculation unit.

FIG. 3 is a diagram illustrating an exemplary block configuration of the wave guide model calculation unit 202 in FIG. 2. In FIG. 3, a delay line 301 includes N (a plurality of) delay units 302 including #0 to #$N-_1$ connected in a cascade manner (in series). The delay unit 302 delays an input signal by one sampling time and outputs the delayed signal. A symbol z−1 in each of the delay units 302 in FIG. 3 indicates that a delay operation for one sample in z-conversion is executed. A signal obtained by adding, by an adder 311, a signal obtained by multiplying the input signal x(n) (see FIG. 2) generated on the basis of the excitation original sound 206 by a predetermined gain by a multiplier 304 to a feedback signal 303 is input to a delay unit 302(#0) at the head of the delay line 301. Outputs of the delay units 302 in the delay line 301 can be taken out from delay line switch terminals d1 to dN, respectively.

In the present embodiment, the wave guide model calculation unit 202 includes three all-pass filter circuits (hereinafter referred to as "APF") 305 including #0, #1, and #2. The APF 305 is connected to both ends of any of the delay units 302 in the delay line 301, thereby operating as the all-pass filter. The APF 305 includes: a multiplier 306 that multiplies a signal on an input side of the connected delay unit 302 by a feedforward gain g (g0, g1, or g2); an adder 309 that adds a signal on an output side of the connected delay unit 302, an output signal of the multiplier 306, and an output signal of a multiplier 308 to be described later and selectively outputs the added output signal to a switch 310; a feedback delay unit 307 that delays the added output signal by one sampling time; and the multiplier 308 that multiplies an output signal of the feedback delay unit 307 by a feedback gain −g (−g0, −g1, or −g2) and outputs the multiplied output signal to the adder 309.

Each set of connection terminals i00 and i01 of the APF 305(#0), connection terminals i10 and i11 of the APF 305(#1), and connection terminals i20 and i21 of the APF 305(#2) is connected to delay line switch terminals at both ends of the same delay unit 302 of the delay line 301.

In addition, the APF 305(#0), the APF 305(#1), and the APF 305(#2) respectively include sets of the feedforward gain and the feedback gain, that is, (g0 and −g0), (g1 and −g1), and (g2 and −g2). Hereinafter, the feedforward gain and the feedback gain are collectively referred to as a filter coefficient of the all-pass filter.

The APF 305(#0), the APF 305(#1), and the APF 305(#2) are always connected to the respective adjacent delay units 302 in the delay line 301, and the order thereof is controlled to be switched in the order of an annular ring by pitch bend control processing to be described later.

Each output destination of the APF 305(#0), the APF 305(#1), or the APF 305(#2) is connected to each output selection terminal o0, o1, or o2 of the switch 310, and one of the output selection terminals is selected to output an output signal y(n), whereby the musical sound signal 209 is output. In addition, the output signal y(n) is multiplied by an output feedback gain by the multiplier 304, and the multiplication result is added to the input signal x(n) by the adder 311.

Figure 4:
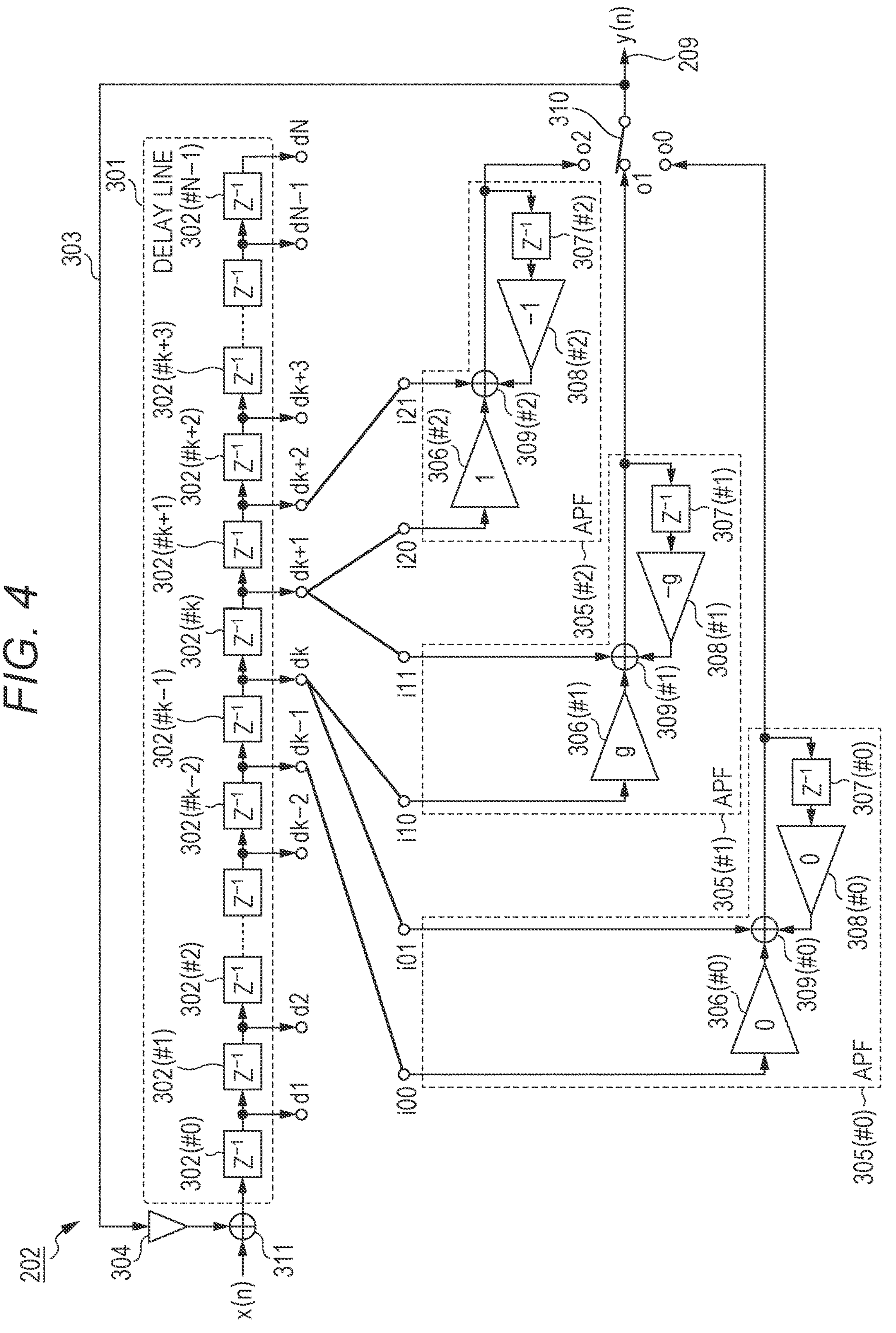
FIG. 4 is a diagram illustrating exemplary connections of three sets of all-pass filters (APFs) to a delay line.

FIG. 4 is a diagram illustrating exemplary connections of the three sets of APFs 305 including #0, #1, and #2 to the delay line 301 in the wave guide model calculation unit 202 in FIG. 2 having the configuration of FIG. 3. As described above, the wave guide model control unit 201 in FIG. 2 calculates the delay length of the wave guide model corresponding to the frequency f at which a sound needs to be generated on the basis of the tone pitch information 203 input from the tone pitch designation switch 111 in FIG. 1, which is the performance operator of the electronic musical instrument, for example, and then, designates the number of delay units k, which is the integer part of the delay length, to the wave guide model calculation unit 202. In addition, the wave guide model control unit 201 in FIG. 2 calculates the filter coefficient g of the APF 305 that defines the fractional part 1 of the delay length by calculation represented by Formula (1) described above, and designates the filter coefficient g to the wave guide model calculation unit 202.

As a result, in the wave guide model calculation unit 202 in FIG. 4, delay line switch terminals dk and dk+1 at both ends of a delay unit 302(#k) in the delay line 301, which is a first delay unit that generates a delay of the integer part of the delay length corresponding to a designated tone pitch designated by the wave guide model control unit 201, are respectively connected to the connection terminals i10 and i11 of the APF 305(#1).

In addition, delay line switch terminals dk−1 and dk at both ends of a delay unit 302(#k−1), which is a zeroth delay unit in an immediately preceding stage of the delay unit 302(#k), which is the first delay unit, in the delay line 301 are respectively connected to the connection terminals i00 and i01 of the APF 305(#0).

Furthermore, delay line switch terminals dk+1 and dk+2 at both ends of a delay unit 302(#k+1), which is a second delay unit in an immediately subsequent stage of the delay unit 302(#k), which is the first delay unit, in the delay line 301 are respectively connected to the connection terminals i20 and i21 of the APF 305(#2).

The wave guide model control unit 201 in FIG. 2 sets the feedforward gain g and the feedback gain-g of the filter coefficient g, calculated by the calculation represented by Formula (1) to correspond to the fractional part 1 of the delay length corresponding to the designated tone pitch, respectively in the multipliers 306(#1) and 308(#1) of the APF 305(#1).

In addition, a value of 0 that causes a delay of a value of 1 in the fractional part is set as the feedforward gain and the feedback gain of the filter coefficient in both of the multipliers 306(#0) and 308(#0) of the APF 305(#0).

Further, values of 1 and −1 that cause a delay of a value of 0 of the fractional part are respectively set as the feedforward gain and the feedback gain of the filter coefficient in the multipliers 306(#2) and 308(#2) of the APF 305(#2).

Then, the switch 310 causes conduction of the output selection terminal o1. As a result, an output signal of the APF 305(#1) is selected as the output signal y(n) via the switch 310, whereby the musical sound signal 209 is output. In addition, the output signal y(n) is multiplied by the output feedback gain by the multiplier 304, and the result is added to the input signal x(n) by the adder 311.

As a result of the above control operation, as the musical sound signal 209, the integer part k of the delay length corresponding to the designated tone pitch is generated by the delay units 302 including #0 to #k−1 in the delay line 301, and the fractional part 1 of the delay length is generated by the APF 305(#1) that operates on the basis of the filter coefficient g calculated by the calculation represented by Formula (1).

In this case, a circuit including the delay line 301 and the APF 305(#1) has flat frequency characteristics, and thus, it is possible to prevent a decrease in amplitude in a high frequency band.

Figure 5:
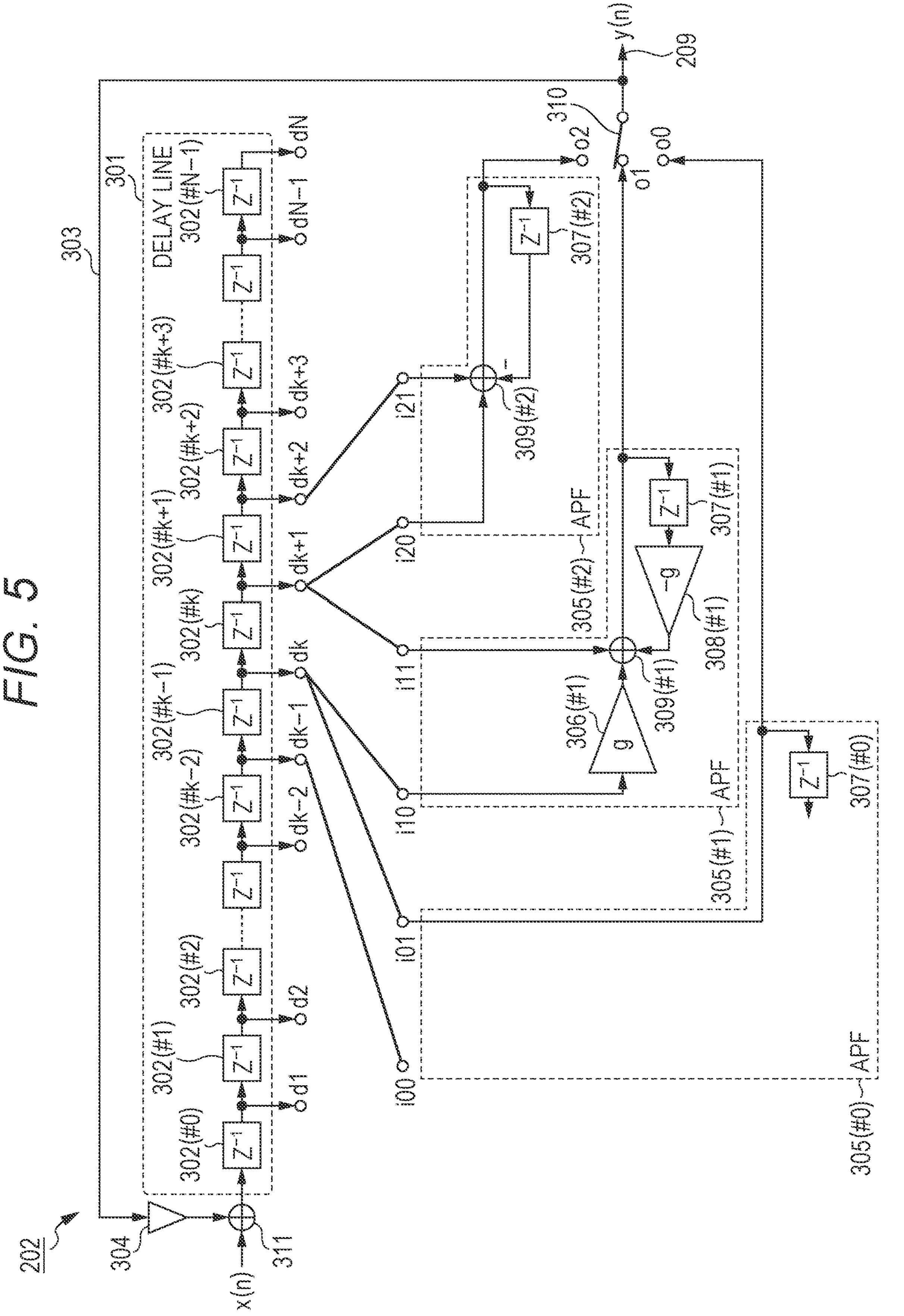
FIG. 5 is an explanatory diagram of an effect of reducing a calculation load in the embodiment.

FIG. 5 is an explanatory diagram of an effect of reducing a calculation load in the embodiment. As described above, the value of 0 that causes the delay of the value of 1 in the fractional part is set as the feedforward gain and the feedback gain of the filter coefficient in both of the multipliers 306(#0) and 308(#0) of the APF 305(#0). Therefore, it is substantially unnecessary for the multipliers 306(#0) and 308(#0) to execute a multiplication operation with a large load, and the APF 305(#0) in FIG. 4 is an equivalent circuit illustrated in FIG. 5. That is, it is sufficient for the APF 305(#0) to execute an operation of outputting an output from the delay unit 302(#k−1) in the delay line 301 via the delay line switch terminal dk directly to the output selection terminal o0 of the switch 310.

On the other hand, the value of 1 and the value of −1 that cause the delay of the value of 0 of the fractional part are respectively set as the feedforward gain and the feedback gain of the filter coefficient in the multipliers 306(#2) and 308(#2) of the APF 305(#2) as described above. Therefore, it is substantially unnecessary for the multipliers 306(#2) and 308(#2) to execute a multiplication operation with a large load, and the APF 305(#2) in FIG. 4 is an equivalent circuit illustrated in FIG. 5. That is, it is sufficient for the APF 305(#2) to execute an operation of inputting an output from the delay unit 302(#k) in the delay line 301 via the delay line switch terminal dk+1 directly to the adder 309 (#2), changing a sign of an output of the feedback delay unit 307(#2) by the multiplier 308(#2), and inputting the output with the changed sign to the adder 309(#2).

As described above, the multiplication operation is substantially necessary only in the APF 305(#1) in the present embodiment, and the multiplication operation is unnecessary in the APF 305(#0) and the APF 305(#2). Therefore, the calculation load can be greatly reduced particularly in musical sound generation by the wave guide modeling with a large number of polyphonic sounds as compared with a technique of JP H6-348277 A in which two all-pass filters are used.

Next, a description will be given regarding a principle of the pitch bend control processing in a case where a player has changed a tone pitch (pitch) of a playing sound being generated by operating the pitch bend sensor 110 (FIG. 1) of the musical instrument.

In FIG. 2, the wave guide model control unit 201 sequentially calculates a delay length of a new designated tone pitch on the basis of the sequentially input bend information 204, and sequentially outputs the number of delay units k, which is an integer part of the delay length, and the filter coefficient g, calculated by the calculation represented by Formula (1) corresponding to the fractional part 1, to the wave guide model calculation unit 202.

Here, if a value of the number of delay units k does not change, only the filter coefficient g changes. This means that a change in wavelength of the musical sound signal 209 settles within one sampling time. For example, in a case where the player performs a pitch bend operation to decrease a pitch so that the fractional part 1 of a delay length corresponding to a new designated tone pitch sequentially increases, a value of the filter coefficient g calculated by the calculation represented by Formula (1) described above is designated to be sequentially decreased.

Figure 6:
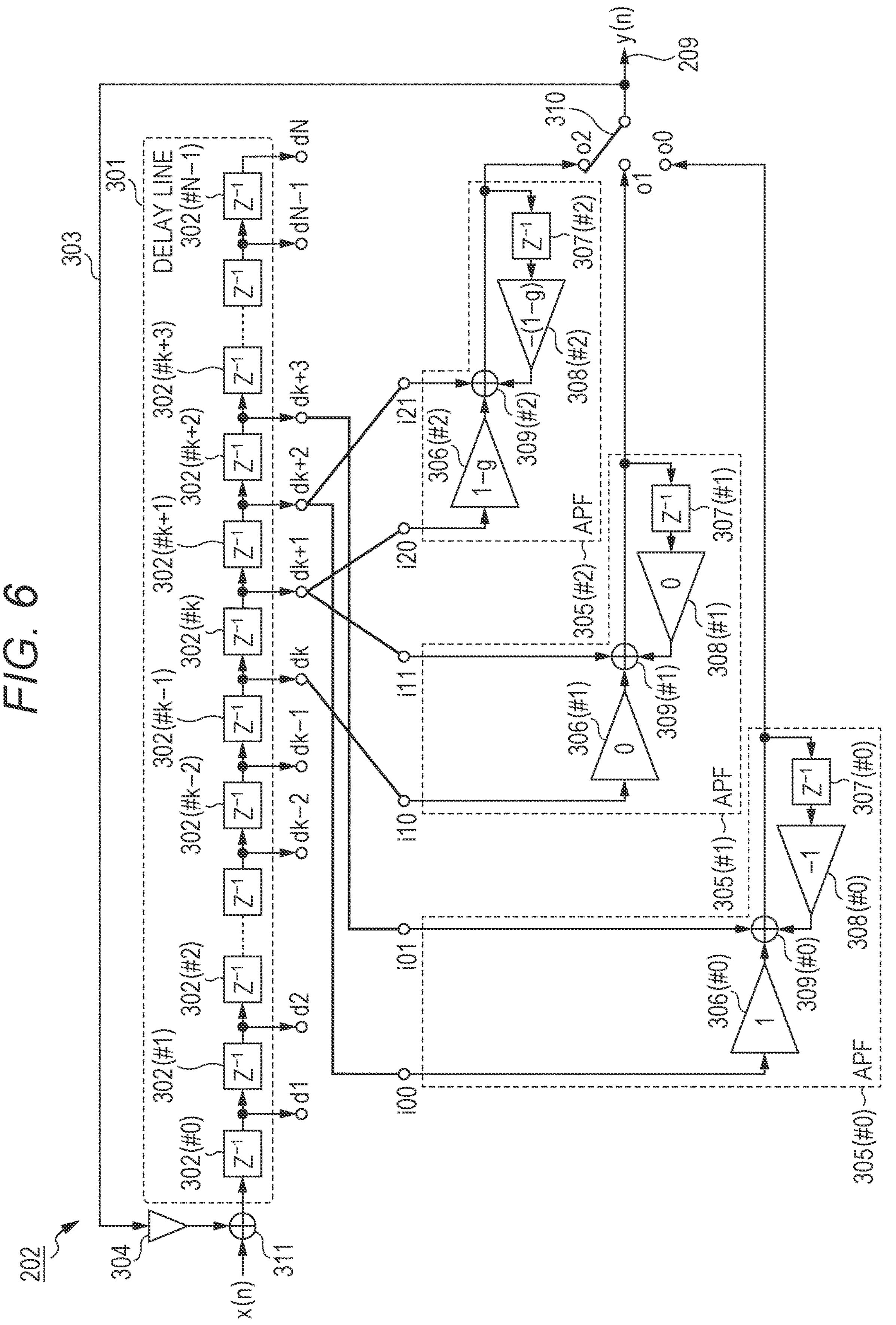
FIG. 6 is a diagram illustrating a change in the connections of the three sets of APFs to the delay line when the number of delay units k, which is an integer part of a delay length, increases.

FIG. 6 is a diagram illustrating a change in the connections of the three sets of APFs 305 to the delay line 301 when the number of delay units k, which is the integer part of the delay length, increases. When the player performs the pitch bend operation to decrease the pitch so that the fractional part 1 of the delay length corresponding to the new designated tone pitch sequentially increases and reaches a value of 1, the wave guide model control unit 201 in FIG. 2 increments a value of the number of delay units k, which is the integer part of the delay length of the designated tone pitch to be output to the wave guide model calculation unit 202, by +1. At this time, the fractional part 1 of the delay length becomes 0 due to the increment of the number of delay units k, the value of the filter coefficient g calculated by the calculation represented by Formula (1) becomes 1.

When the value of the number of delay units k designated by the wave guide model control unit 201 has been incremented by +1 and changed in this manner, in the wave guide model calculation unit 202 illustrated in FIG. 6, the operation of the all-pass filter is handed over to the APF 305(#2), which has been connected to the delay line switch terminals dk+1 and dk+2 at both ends so far, with a new delay unit 302(#k+1) in the delay line 301 corresponding to the changed number of delay units k+1 as a new first delay unit.

In addition, as a result of the handover in FIG. 6, the switch 310 cuts off the conduction of the output selection terminal o1 and newly causes conduction of the output selection terminal o2.

At this time, the value of 1 and the value of −1 that cause the delay of the value of 0 of the fractional part are respectively set as the feedforward gain and the feedback gain of the filter coefficient in the multipliers 306(#2) and 308(#2) of the APF 305(#2) for the operation as described above. Therefore, the above-described operation of switching the operation of the all-pass filter from the APF 305(#1) to the APF 305(#2) matches well with the operation of controlling the fractional part 1 designated by the wave guide model control unit 201 in FIG. 2 to 0.

In addition, the APF 305(#2) continuously operates according to actual signals from the delay line switch terminals dk+1 and dk+2, and thus, it is possible to perform control so as not to generate noise at the time of switching the APF 305.

Here, as the value of the fractional part 1 increases in the APF 305(#1), the value of the filter coefficient g calculated by the calculation represented by Formula (1) decreases toward 0 as described above. However, when the control is switched from the APF 305(#1) to the APF 305(#2), the operation is started with the value of the fractional part 1 being reset to 0, and thus, it is necessary to cause a jump of the value of the filter coefficient g from the vicinity of 0 to the vicinity of 1 at this moment. Such a discontinuous jump of the value is not so preferable when envelope control is performed on the filter coefficient g.

Therefore, in the present embodiment, in a case where the delay unit 302 operating as the first delay unit is, for example, an even-numbered delay unit, the filter coefficient g is calculated by the calculation processing represented by Formula (1) described above.

On the other hand, in a case where the delay unit 302 operating as the first delay unit is, for example, an odd-numbered delay unit, the filter coefficient g is calculated by calculation processing represented by the following Formula (2).

$$\begin{aligned} g &= 1-(1-1)/(1+1) \\ &= \{(1+1)-(1-1)\}/(1+1) \\ &= 2\times 1/(1+1) \end{aligned} \quad (2)$$

In this case, coefficients (1−g) and −(1−g) calculated using the coefficient g calculated by the calculation represented by the above Formula (2) are respectively set as a feedforward gain and a feedback gain in the multipliers 306 and 308.

In the example of FIG. 6, for example, in a case where the APF 305(#1) has executed the operation of the all-pass filter so far and g and −g have been set as a feedforward gain and a feedback gain in the multipliers 306(#1) and 308(#1), control may be performed such that (1−g) and −(1−g) are set as the feedforward gain and the feedback gain in the multipliers 306(#2) and 308(#2), respectively, when the operation of the all-pass filter is switched from the APF 305(#1) to the APF 305(#2) as described above.

Figure 7:
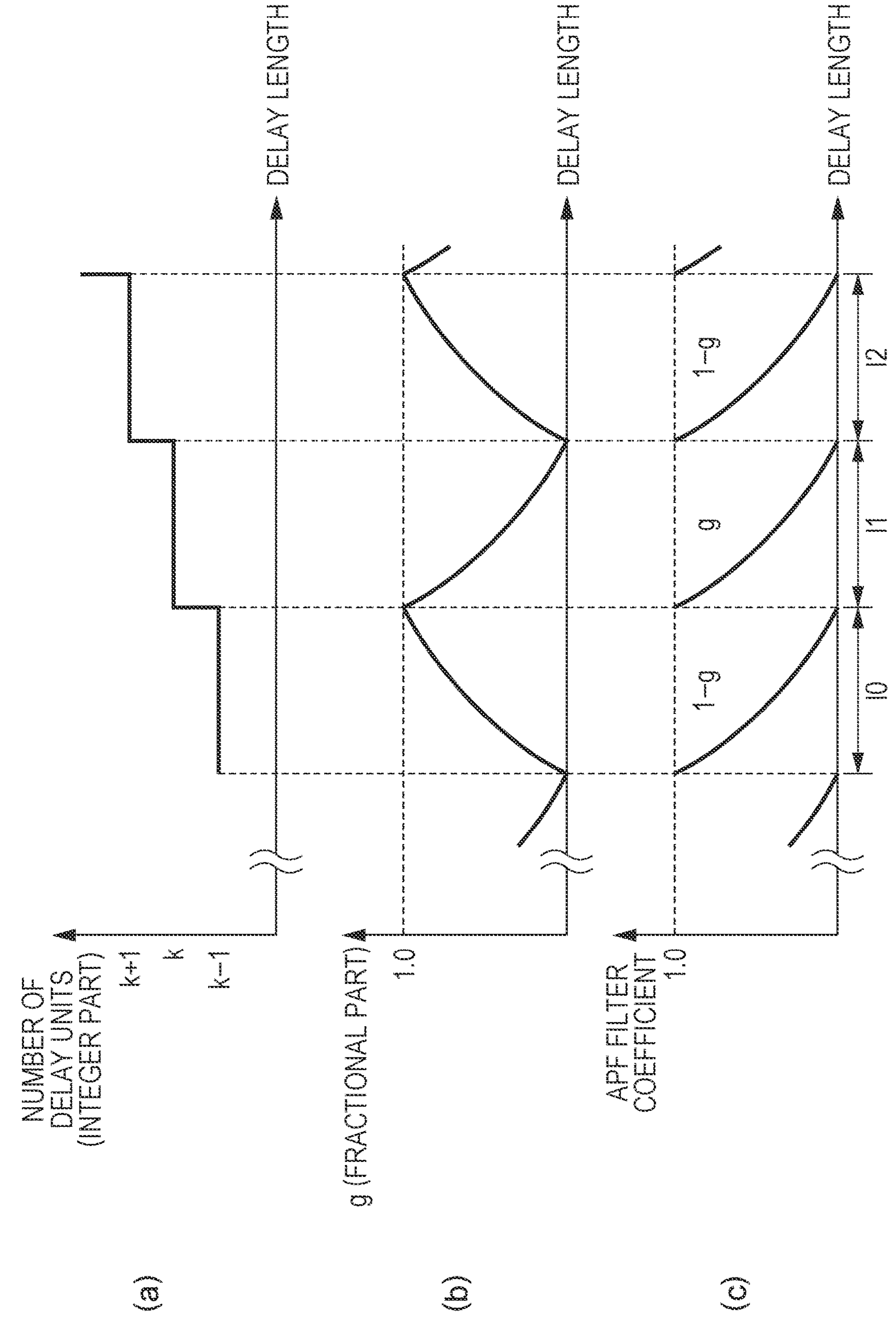
FIG. 7A is an explanatory view of a method of continuously controlling a filter coefficient.
FIG. 7B is an explanatory view of a method of continuously controlling a filter coefficient.
FIG. 7C is an explanatory view of a method of continuously controlling a filter coefficient.

FIGS. 7A to 7C are explanatory views of a method of continuously controlling the filter coefficient g. For example, a case is considered in which the filter coefficient g decreases with an increase of a fraction of a delay length as illustrated in FIG. 7B by the calculation represented by Formula (1) in a section l1 in which a value of the number of delay units, which is an integer part of the delay length, is k as illustrated in FIG. 7A. When a value of the filter coefficient g reaches 0 in the section l1, the value of the number of delay units, which is the integer part of the delay length, is switched from k to k+1, which is a section 12, as illustrated in FIG. 7A. In the new section 12, the value of the filter coefficient g is controlled to increase from the minimum value of 0 with the increase of the fraction of the delay length as illustrated in FIG. 7B by the calculation represented by Formula (2) by the control method described above.

As described above, in the present embodiment, the filter coefficient g can be calculated by switching between the calculation represented by Formula (1) and the calculation represented by Formula (2) depending on whether the delay unit 302 operating as the first delay unit is an even-numbered (or odd-numbered) delay unit or an odd-numbered (or even-numbered) delay unit, and the filter coefficient g designated to the wave guide model calculation unit 202 by the wave guide model control unit 201 in FIG. 2 can be continuously changed as illustrated in FIG. 7B by switching between the set of g and −g and the set of (1−g) and −(1−g) to be set in the multipliers 306 and 308 in the APF 305.

As a result, the filter coefficient g changing as illustrated in FIG. 7B can be output as an envelope value by the calculation processing represented by Formula (1) or (2) with the fractional part 1 of the delay length as the input by using an envelope generator circuit generally used in the electronic musical instrument technology.

In FIG. 6, in a case where the number of delay units k, which is an integer part of a delay length, increases so that an object that performs the operation of the all-pass filter as a first delay unit is switched from the APF 305(#1) to the new APF 305(#2) as described above, the delay unit 302(#k) that has operated as the first delay unit so far is recognized as a zeroth delay unit in an immediately preceding stage of the delay unit 302(#k+1), which is a new first delay unit, and a value of 0 that causes a delay of a value of 1 of a fractional part as an all-pass filter circuit connected to the zeroth delay unit is set as the feedforward gain and the feedback gain of the filter coefficient in both of the multipliers 306(#1) and

308(#1) of the APF 305(#1) which has been connected to the delay line switch terminals dk and dk+1 on both sides as illustrated in FIG. 6.

In addition, in FIG. 6, the delay unit 302(#k+2) is recognized as a second delay unit in an immediately subsequent stage of the delay unit 302(#k+1) which is a new first delay unit, the connection terminals i00 and i01 of the APF 305(#0) are newly connected to the delay line switch terminals dk+2 and dk+3 on both sides, respectively, and a value of 1 and a value of −1 that cause a delay of a value of 0 of a fractional part as an all-pass filter circuit connected to the second delay unit are respectively set as the feedforward gain and the feedback gain of the filter coefficient in the multipliers 306(#0) and 308(#0) of the APF 305(#0).

Note that an output of the feedback delay unit 307 may be cleared to 0 before the connection of each of the APFs 305 is switched as described above.

Figure 8:
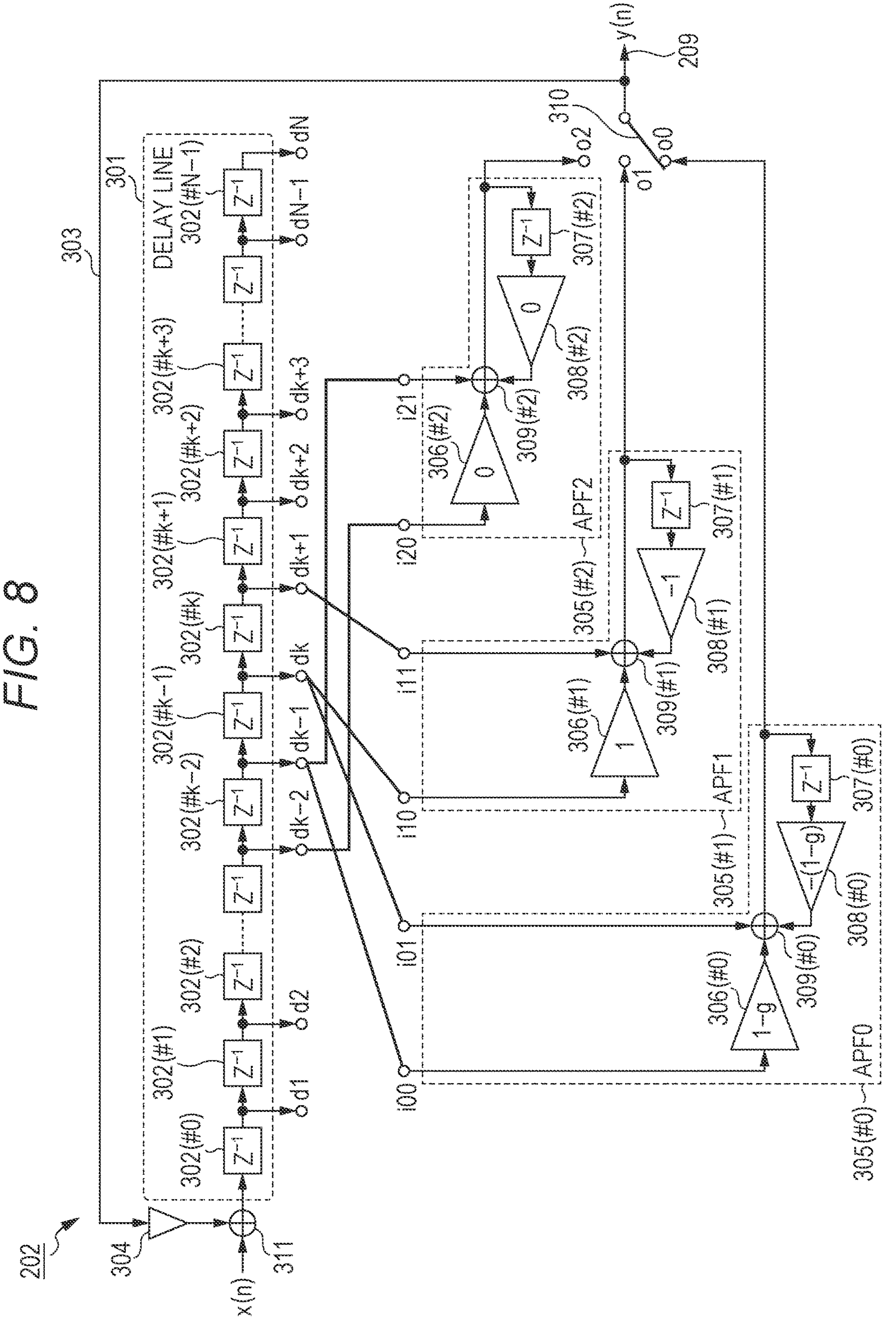
FIG. 8 is a diagram illustrating a change in the connections of the three sets of APFs to the delay line when the number of delay units k, which is the integer part of the delay length, decreases.

FIG. 8 is a diagram illustrating a change in the connections of the three sets of APFs 305 to the delay line 301 when the number of delay units k, which is the integer part of the delay length, decreases. When the player performs the pitch bend operation to increase the pitch so that the fractional part 1 of the delay length corresponding to the new designated tone pitch sequentially decreases and reaches a value of 0, the wave guide model control unit 201 in FIG. 2 decrements a value of the number of delay units k, which is the integer part of the delay length of the designated tone pitch to be output to the wave guide model calculation unit 202, by 1. At this time, the fractional part 1 of the delay length becomes the maximum value of 1 due to the decrement of the number of delay units k, the value of the filter coefficient g calculated by the calculation represented by Formula (1) becomes 0.

When the value of the number of delay units k designated by the wave guide model control unit 201 has been decremented by 1 and changed in this manner, in the wave guide model calculation unit 202 illustrated in FIG. 8, the operation of the all-pass filter is handed over to the APF 305(#0), which has been connected to the delay line switch terminals dk−1 and dk at both ends so far, with a new delay unit 302(#k−1) in the delay line 301 corresponding to the changed number of delay units k−1 as a new first delay unit.

In addition, as a result of the handover in FIG. 8, the switch 310 cuts off the conduction of the output selection terminal o1 and newly causes conduction of the output selection terminal o0.

At this time, the value of 0 that cause the delay of the value of 1 of the fractional part is set as the feedforward gain and the feedback gain of the filter coefficient in both the multipliers 306(#0) and 308(#0) of the APF 305(#0) for the operation as described above. Therefore, the above-described operation of switching the operation of the all-pass filter from the APF 305(#1) to the APF 305(#0) matches well with the operation of controlling the fractional part 1 designated by the wave guide model control unit 201 in FIGS. 2 to 1.

In addition, the APF 305(#0) continuously operates according to actual signals from the delay line switch terminals dk−1 and dk, and thus, it is possible to perform control so as not to generate noise at the time of switching the APF 305.

Here, as the value of the fractional part 1 decreases in the APF 305(#1), the value of the filter coefficient g calculated by the calculation represented by Formula (1) increases toward 1 as described above. However, when the control is switched from the APF 305(#1) to the APF 305(#0), the operation is started with the value of the fractional part 1 being set to 1, and thus, it is necessary to cause a jump of the value of the filter coefficient g from the vicinity of 1 to the vicinity of 0 at this moment. Such a non-linear jump of the value is not so preferable when envelope control is performed on the filter coefficient g even in the case where the value of the number of delay units k, which is the integer part of the delay length, decreases as in the case where the value of the number of delay units k, which is the integer part of the delay length, increases.

Therefore, in the present embodiment, control is performed to calculate the filter coefficient g by switching between the calculation represented by Formula (1) described above and the calculation represented by Formula (2) depending on whether the delay unit 302 operating as the first delay unit is an even-numbered (or odd-numbered) delay unit or an odd-numbered (or even-numbered) delay unit, and to switch between the set of g and −g and the set of (1−g) and −(1−g) to be set in the multipliers 306 and 308 in the APF 305 as in the case where the value of the number of delay units k, which is the integer part of the delay length, increases.

In the example of FIG. 8, for example, in a case where the APF 305(#1) has executed the operation of the all-pass filter so far and g and −g have been set as a feedforward gain and a feedback gain in the multipliers 306(#1) and 308(#1), control may be performed such that (1−g) and −(1−g) are set as the feedforward gain and the feedback gain in the multipliers 306(#0) and 308(#0), respectively, when the operation of the all-pass filter is switched from the APF 305(#1) to the APF 305(#0) as described above.

For example, in FIGS. 7A to 7C described above, a case is considered in which the filter coefficient g increases with a decrease of a fraction of a delay length as illustrated in FIG. 7B by the calculation represented by Formula (1) in a section l1 in which a value of the number of delay units, which is an integer part of the delay length, is k as illustrated in FIG. 7A. When a value of the filter coefficient g reaches 1 in the section l1, the value of the number of delay units, which is the integer part of the delay length, is switched from k to k−1, which is a section 10, as illustrated in FIG. 7A. In the new section 10, the value of the filter coefficient g is controlled to decrease from the maximum value of 1 with the decrease of the fraction of the delay length as illustrated in FIG. 7B by the calculation represented by Formula (2) by the control method described above.

As described above, in the present embodiment, even in the case where the value of the number of delay units k, which is the integer part of the delay length, decreases, it is possible to calculate the filter coefficient g by switching between the calculation represented by Formula (1) and the calculation represented by Formula (2) depending on whether the delay unit 302 operating as the first delay unit is an even-numbered (or odd-numbered) delay unit or an odd-numbered (or even-numbered) delay unit, and to continuously change the filter coefficient g, designated to the wave guide model calculation unit 202 by the wave guide model control unit 201 in FIG. 2, as illustrated in FIG. 7B by switching between the set of g and −g and the set of (1−g) and −(1−g) to be set in the multipliers 306 and 308 in the APF 305 as in the case where the value of the number of delay units k, which is the integer part of the delay length, increases.

As a result, the filter coefficient g changing as illustrated in FIG. 7B can be output as an envelope value by the calculation processing represented by Formula (1) or (2) with the fractional part 1 of the delay length as the input by using an envelope generator circuit generally used in the electronic musical instrument technology.

In FIG. 8, in a case where the number of delay units k, which is an integer part of a delay length, decreases so that an object that performs the operation of the all-pass filter as a first delay unit is switched from the APF 305(#1) to the new APF 305(#0) as described above, the delay unit 302(#k) that has operated as the first delay unit so far is recognized as a second delay unit in an immediately subsequent stage of the delay unit 302(#k−1), which is a new first delay unit, and a value of 1 and a value of −1 that cause a delay of a value of 0 of a fractional part as an all-pass filter circuit connected to the second delay unit are respectively set as the feedforward gain and the feedback gain of the filter coefficient in both of the multipliers 306(#1) and 308(#1) of the APF 305(#1) which has been connected to the delay line switch terminals dk and dk+1 on both sides as illustrated in FIG. 8.

In addition, in FIG. 8, the delay unit 302(#k−2) is recognized as a zeroth delay unit in an immediately preceding stage of the delay unit 302(#k−1) which is a new first delay unit, the connection terminals i20 and i21 of the APF 305(#2) are newly connected to the delay line switch terminals dk−2 and dk−1 on both sides, respectively, and a value of 0 that causes a delay of a value of 1 of a fractional part as an all-pass filter circuit connected to the zeroth delay unit is set as the feedforward gain and the feedback gain of the filter coefficient in both the multipliers 306(#2) and 308(#2) of the APF 305(#2).

Note that the output of the feedback delay unit 307 may be cleared to 0 before the connection of each of the APFs 305 is switched as described above, which is similar to the case of FIG. 6.

Figure 9:
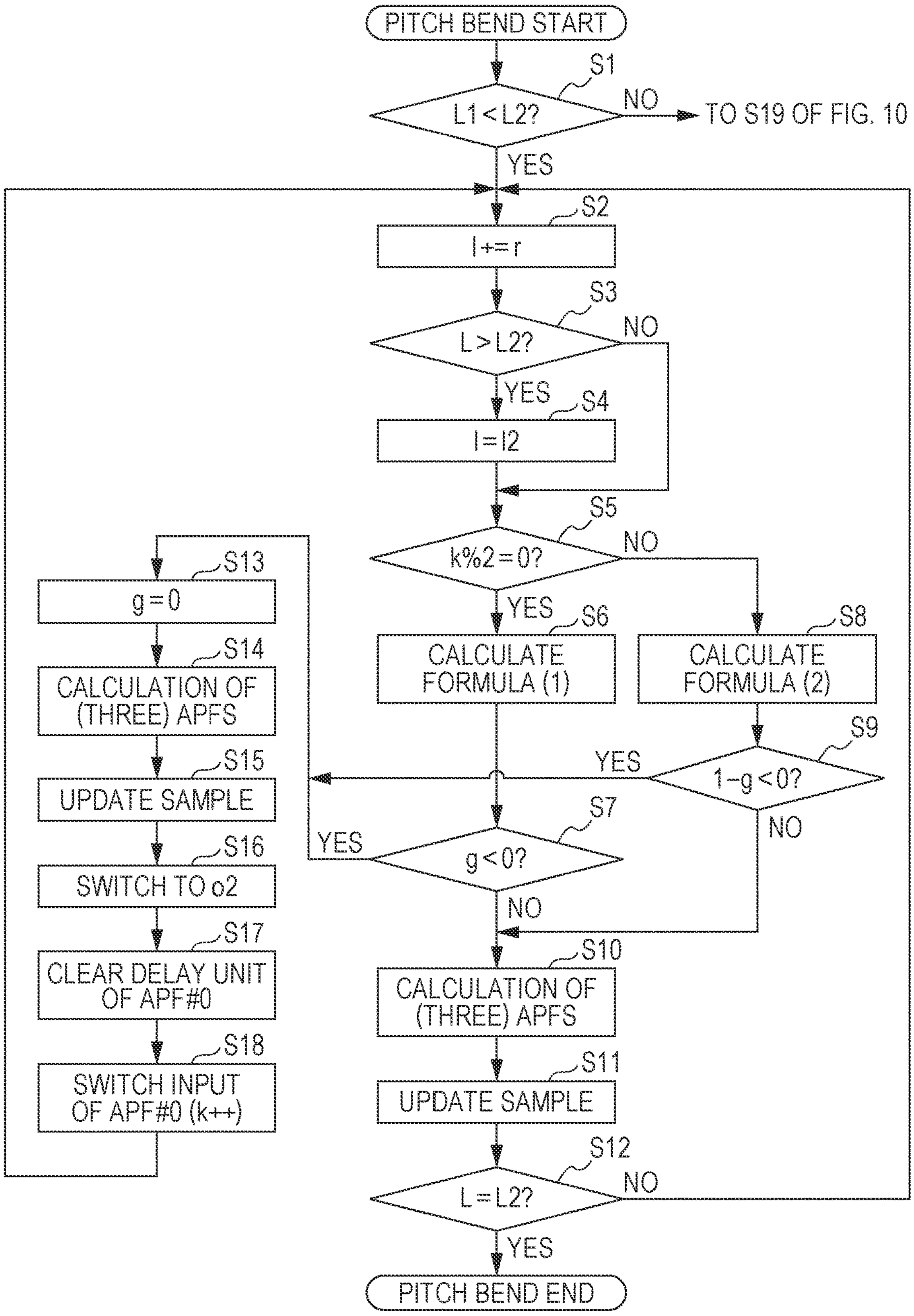
FIG. 9 is a flowchart (Part 1) illustrating an example of pitch bend control processing.
Figure 10:
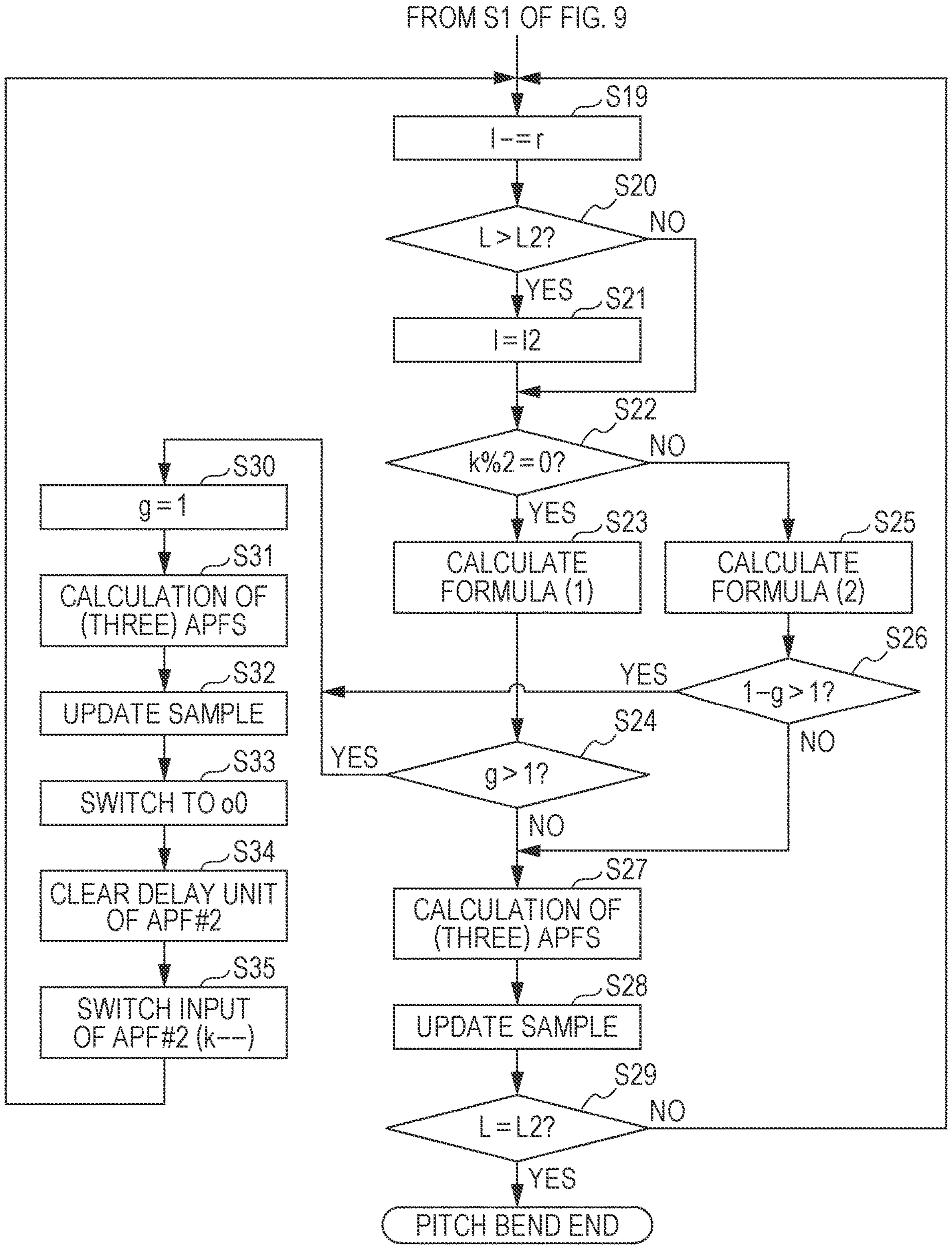
FIG. 10 is a flowchart (Part 2) illustrating an example of the pitch bend control processing.

FIGS. 9 and 10 are flowcharts illustrating an example of the pitch bend control processing executed on the basis of the principle described above. This processing is processing in which the CPU 101 in FIG. 1 loads a pitch bend control program stored in the ROM 102 onto the RAM 103 and executes the program. The flowcharts in FIGS. 9 and 10 are views obtained by expressing, as flowcharts, control time sequences of the wave guide model control unit 201 and the wave guide model calculation unit 202 in FIG. 2 in a case where a value of the number of delay units k, which is an integer part of a delay length of a designated tone pitch, and the fractional part 1 is changed from L1 to L2 by the pitch bend sensor 110 after sound generation when the APF 305(#0) is connected to both the ends of the delay unit 302(#k−1), the APF 305(#1) is connected to both the ends of the delay unit 302(#k), and the APF 305(#2) is connected to both the ends of the delay unit 302(#k+1).

When pitch bend is started, the CPU 101 determines whether L2 is larger or smaller than L1, that is, whether to execute bend-down or bend-up in step S1.

When L1<L2, that is, in the case of the bend-down, the CPU 101 adds a rate r to the fractional part 1 of the delay length in step S2. Note that "+=" represents an operation of adding a variable value on the right side to a variable value on the left side.

When L which is a value of the fractional part 1 and the number of delay units k which is an integer part of a delay length, is larger than a target value in step S3, the CPU 101 causes the fractional part 1 to coincide with l2 for coincidence with the target value in step S4.

Next, the CPU 101 determines whether the number of delay units k is an even number or an odd number in step S5. Note that "%" is an operation of calculating a remainder obtained by dividing the value of the number of delay units k by 2. The number of delay units k is the even number if a result of the operation is 0, and the number of delay units k is the odd number if the result of the operation is not 0.

When k is the even number, the CPU 101 sets a coefficient calculated from the fractional part 1 by the calculation represented by Formula (1) as the filter coefficient g in step S6.

When k is the odd number, the CPU 101 sets a coefficient calculated from the fractional part 1 by the calculation represented by Formula (2) as 1−g in step S8.

Thereafter, when g<0 or 1-g<0 is not satisfied in step S7 or step S9, there is no carry in the number of delay units k, which is the integer part of the delay length, and thus, the CPU 101 directly executes the all-pass filter calculation of each of the APF 305(#0), the APF 305(#1), and the APF 305(#2) in step S10, and then, updates a sample in step S11. Updating the sample means shifting data in each of the delay units 302 of the delay line 301 one by one to advance a waveform.

The CPU 101 ends the processing when it is determined in step S12 that L has reached the target value, and repeats the processing while adding the rate r to L until L reaches the target value when it is determined that L has not reached the target value.

A case where g<0 or 1−g<0 is satisfied in step S7 or step S9 is a case where there is a carry in the number of delay units k, which is the integer part of the delay length. In this case, the CPU 101 sets g=0 in step S13.

In this state, the CPU 101 executes the all-pass filter calculation of each of the APF 305(#0), the APF 305(#1), and the APF 305(#2) in step S14. In this case, the calculation is executed in the APF 305(#1) with the number of delay units k and the filter coefficient of 0, and in the APF 305(#2) with the number of delay units k+1 and the filter coefficient of 1. Since the calculation is started with a value of the feedback delay unit being set to 0 in the APF 305(#2), a signal of i20 is directly output due to the property of the all-pass filter. On the other hand, the calculation is executed with g=0 in the APF 305(#1), and thus, a signal of i11 is directly output. The signals of i20 and i11 are the same. Therefore, at this timing, signals output to the output selection terminals o1 and o2 are equal. Thus, noise is not generated even if the switch 310 switches the output selection terminal from o1 to o2 in step S16.

Thereafter, in step S15, the CPU 101 updates the sample as in step S11.

Subsequently, the CPU 101 switches the switch 310 to the output selection terminal o2.

Thereafter, the CPU 101 clears data in the feedback delay unit 307(#0) of the APF 305(#0) to 0 in step S17.

Thereafter, the CPU 101 reconnects the connection terminals i00 and i01 of the APF 305(#0) to the delay line switch terminals dk+2 and dk+3, respectively, in step S18. In addition, the filter coefficient g0 of the APF 305(#0) is changed from 0 to 1.

A state of the wave guide model calculation unit 202 after switching of the connection of the APF 305(#0) is the same as described above with reference to FIG. 6. The process of step S18 is equivalent to the operation of incrementing the number of delay units k, which is the integer part of the delay length, by +1. In the drawing, "++" represents an increment operation by +1.

After the process of step S18, the CPU 101 returns to the process of step S2 and repeats the operation of increasing the delay length. At this time, the APF 305(#2) is an object for changing the filter coefficient. Thereafter, the APF 305(#0), the APF 305(#1), and the APF 305(#2) become objects of filter coefficient calculation one after another in the ascending order of the annular ring each time the number of delay units k is incremented.

In step S1 of FIG. 9, when L1>L2, that is, in the case of bend-up, processes in and after step S19 of the flowchart of FIG. 10 is executed. When L1>L2, the following differences occur as compared with the case of L1<L2.

First, the CPU 101 subtracts the rate r from the fractional part 1 in step S19. In the drawing, "-=" represents an operation of subtracting a variable value on the right side from a variable value on the left side.

In addition, it is determined in step S24 or step S26 whether there is a borrow in the number of delay units k, which is the integer part of the delay length, depending on whether g>1 or 1−g>1 is satisfied.

A case where it is determined that g>1 or 1−g>1 is satisfied is a case where there is the borrow in the number of delay units k. In this case, the CPU 101 sets g=1 in step S30.

The CPU 101 further executes the calculation and sample update of each of the APF 305(#0), the APF 305(#1), and the APF 305(#2) in steps S31 and S32. In the subsequent state, the calculation is performed with the filter coefficient g=1 in the APF 305(#1), and a signal of i10 is output substantially without any change although there is some influence of feedback. The calculation is continued with the filter coefficient of 0 in the APF 305(#0), a signal of i01 is directly output. The signals of i10 and i01 are substantially the same. Therefore, noise is not generated even if the output selection terminal is switched from the output selection terminal o1 to the output selection terminal o0 by the switch 310 in step S33.

The CPU 101 switches the switch 310 to the output selection terminal o0 in step S33.

Thereafter, the CPU 101 clears data in the feedback delay unit 307(#2) of the APF 305(#2) to 0 in step S34.

Thereafter, the CPU 101 connects the connection terminals i20 and i21 of the APF 305(#2) to the delay line switch terminals dk−2 and dk−1, respectively, in step S35.

A state of the wave guide model calculation unit 202 after switching of the connection of the APF 305(#2) is the same as described above with reference to FIG. 8. The process of step S35 is equivalent to the operation of decrementing the number of delay units k, which is the integer part of the delay length, by 1. In the drawing, "--" represent a decrement operation by 1.

After the process of step S35, the CPU 101 returns to the process of step S19 and repeats the operation of decreasing the delay length. At this time, the APF 305(#0) is an object for changing the filter coefficient. Thereafter, the APF 305 (#0), the APF 305(#1), and the APF 305(#2) become objects of the filter coefficient calculation one after another in the descending order of the annular ring each time the number of delay units k is decremented.

Figure 11:
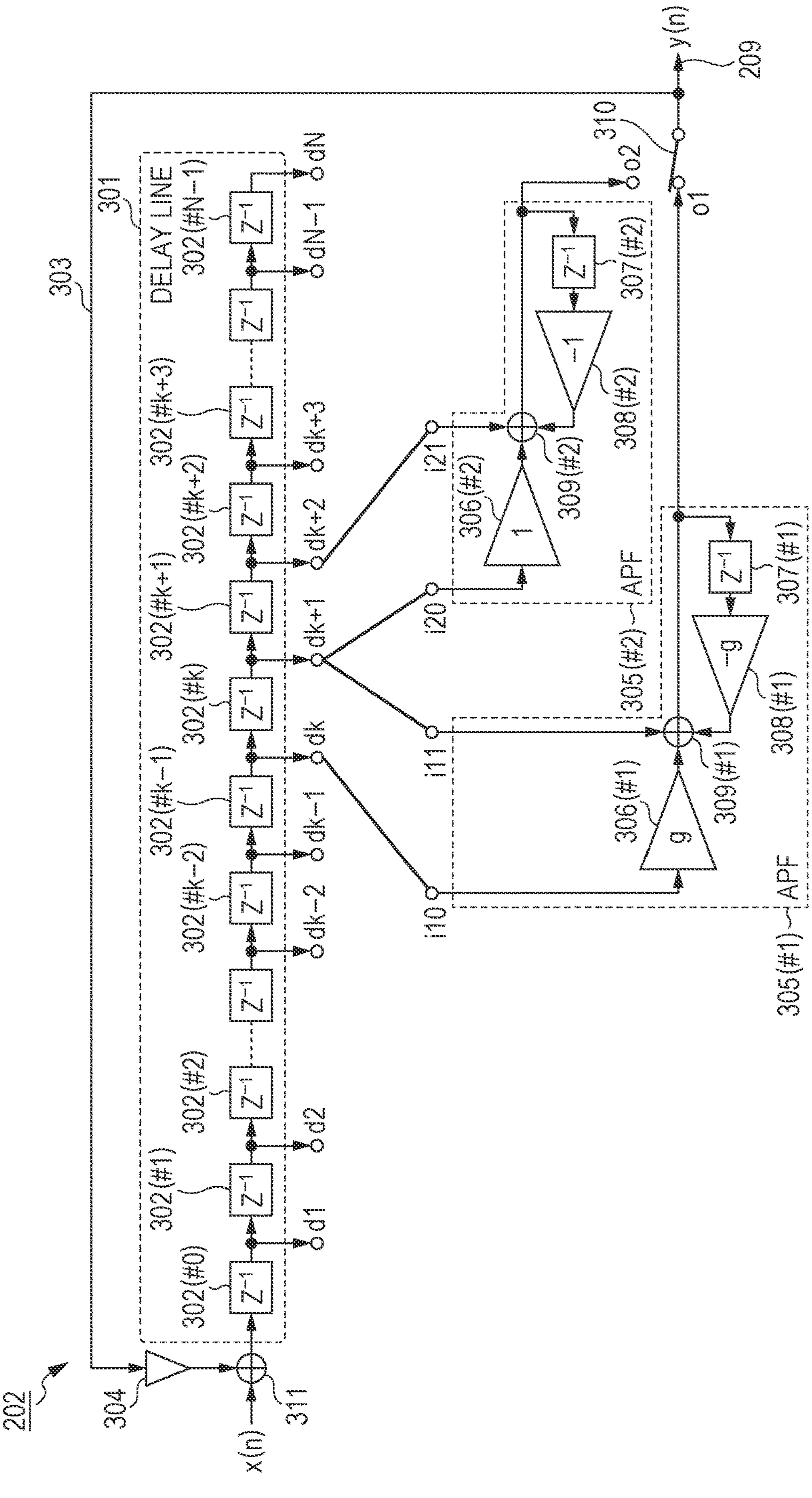
FIG. 11 is a diagram illustrating another embodiment of a wave guide model calculation unit.

In pitch change processing in which the delay length decreases, the connection is changed with the filter coefficient of the APF 305 being set to 0, and the calculation is started in a state where the filter coefficient is small when the rate r is sufficiently small as described in step S35 in FIG. 10. Thus, noise appearing in the next sample is small even if a value on the feedback side is undefined (discontinuous). Therefore, as a modification of the present embodiment, the APF 305(#1) and the APF 305(#2) are calculated with the APF 305(#0) having been removed as illustrated in FIG. 11, the APF 305(#1) is then reconnected instead of the APF 305(#0) in step S18 of FIG. 9, and the APF 305(#2) is reconnected to the delay line switch terminals dk−1 and dk in step S35 of FIG. 10, but the influence of noise is small, and the number of delay units can be changed. In this case, the number of times of multiplication can be reduced by twice.

Although it has been described that the number of times of multiplication can be reduced in the APF 305(#0) and the APF 305(#2) in FIG. 5, the multiplication operation may be left with priority given to uniformity of algorithms and hardware. The final output signal y(n) is connected to o1 when no pitch bend occurs during sound generation. At this time, the output signals of the APF 305(#0) and the APF 305(#2) are not output from the output selection terminals o0 and o2, but are calculated and prepared for the occurrence of the pitch bend during the sound generation described above.

As described above, since the plurality of APFs 305 are connected to the respective adjacent delay units 302 in the delay line 301 in advance to prevent undefined data from entering the delay unit 302 in the present embodiment, it is possible to suppress the noise when the number of delay units 302 changes during the sound generation of the wave guide model. In addition, it is possible to reduce the number of times of multiplication in the two APFs 305 other than the APF 305 connected to the first delay unit in the present embodiment.

Then, it is possible to eliminate the frequency dependence of the amplitude and to suppress generation of noise with a small amount of calculation when the number of connections of the delay units changes by using the fractional delay block, such as the all-pass filter, in a wave guide modeling sound source according to the present embodiment. Specifically, there is an advantage in that the number of times of multiplication is reduced by up to four times per one wave guide model. This is because there are about 230 strings in the case of a piano, for example, and the multiplication is reduced by 920 times if all the strings are modeled and operated.

In addition, the envelope control can be easily applied to the filter coefficient since the filter coefficient can be continuously changed according to the present embodiment.

The block diagrams illustrated in the respective drawings described above can be replaced with software. For example, in a case where the entire configuration of FIG. 3 is replaced with software, software processing can be implemented as a processor calculates and outputs filter coefficients from a mathematical expression for deriving delay lengths of pairs of each of a zeroth to second delay units and each of the APFs 305(#0 to #2), calculates a waveform with the filter coefficient of the pair of the first delay unit and the APF 305(#1) and applies the waveform to an output. In addition, regarding the switching operation of the APF 305 described with reference to FIG. 6, software processing can be implemented as the processor periodically outputs the filter coefficients from the mathematical expression for deriving the delay lengths of the pairs of each of the zeroth to second delay units and each of the APFs 305(#0 to #2) before switching, regards a case where the filter coefficient corresponding to the APF 305(#1) exceeds a predetermined range as switching, and then, outputs filter coefficients from a mathematical expression for deriving delay lengths of pairs of each of new zeroth to second delay units and each of the APFs 305(#0 to #2) after the switching, calculates a waveform with the filter coefficient of the new pair of the first delay unit and the APF 305(#1), and applies the waveform to an output. Furthermore, it is also possible to combine the embodiment using the circuit with software, and replace a part of the circuit with the software.

The control program is stored in the ROM 102 in the above-described embodiment, but is not limited thereto, and may be stored in a removable storage medium, such as a USB memory, a CD, and a DVD, or may be stored in a server. The musical sound signal generation device 100 may acquire the control program from such a storage medium or may acquire the control program from the server via a network.

In addition, the number of all-pass filters described in the above embodiment is not limited to three, and four or more all-pass filters may be provided.

In addition, the present invention is not limited to the above-described embodiment, and various modifications can be made in an implementation stage within a scope not departing from a gist thereof. In addition, functions executed in the above-described embodiment may be suitably combined and implemented as much as possible. The above-described embodiment includes different stages, and various inventions can be extracted by combining suitably a plurality of disclosed structural requirements. For example, even when some structural requirements are deleted from all the structural requirements disclosed in the embodiment, a configuration from which the structural requirements have been deleted can be extracted as an invention as long as the effect can be obtained.

What is claimed is:

1. A musical sound signal generation device comprising:

a delay line provided with a plurality of delay units which are connected in a cascade manner and respectively delay input signals by a first delay length;

at least three fractional delay blocks each of which is connected to correspond to any delay unit among the plurality of delay units and delays an input signal by a second delay length equal to or less than the first delay length; and at least one processor that sets any one of the plurality of delay units as a first delay unit which generates a delay corresponding to a designated tone pitch, sets a delay unit in a preceding stage of the first delay unit among the plurality of delay units as a zeroth delay unit, and sets a delay unit in a subsequent stage of the first delay unit among the plurality of delay units as a second delay unit, wherein the at least one processor connects the at least three fractional delay blocks to the first delay unit, the zeroth delay unit, and the second delay unit, respectively, and continuously connects any one of the connected zeroth delay unit and the connected second delay unit to the fractional delay block and connects at least any one of a new zeroth delay unit and a new second delay unit to at least any one of the fractional delay blocks other than the fractional delay block connected to a new first delay unit in response to setting any one of the connected zeroth delay unit and the connected second delay unit as the new first delay unit, setting a delay unit in a preceding stage of the new first delay unit as the new zeroth delay unit, and setting a delay unit in a subsequent stage of the new first delay unit as the new second delay unit in accordance with a change in the designated tone pitch.

2. The musical sound signal generation device according to claim 1, wherein each of the at least three fractional delay blocks operates as an all-pass filter block together with the delay unit corresponding to the fractional delay block.

3. The musical sound signal generation device according to claim 2, wherein the at least one processor sets a filter coefficient corresponding to the second delay length, which is a fractional part of a delay length corresponding to the designated tone pitch, in the all-pass filter block which is the fractional delay block corresponding to the first delay unit, sets filter coefficients having a value of 0 and a value of 1, which correspond to the second delay length having a value of 1 and a value of 0, in the all-pass filter block which is the fractional delay block corresponding to the zeroth delay unit and the all-pass filter block which is the fractional delay block corresponding to the second delay unit, respectively, and outputs an output of the all-pass filter block, which is the fractional delay block corresponding to the first delay unit, as a musical sound signal and a feedback signal to the input of the delay line.

4. The musical sound signal generation device according to claim 1, wherein when a fractional part of the delay length is denoted by 1, the at least one processor, sets a coefficient g calculated by calculation represented by a calculation formula of $$g=(1-1)/(1+1) \quad (1)$$

as the filter coefficient corresponding to the second delay length which is the fractional part of the delay length corresponding to the designated tone pitch, in a case where the first delay unit is an even-numbered or odd-numbered delay unit, and sets, as the filter coefficient, a coefficient (1−g) calculated by using a coefficient g calculated by calculation represented by a calculation formula of $$g=2\times 1/(1+1) \quad (2)$$

in a case where the first delay unit is an odd-numbered or even-numbered delay unit, wherein the musical sound signal generation device further comprising an envelope generator circuit configured to receive, as an input, the fractional part 1 of the delay length and outputs, as an envelope value, the coefficient g that changes as represented by the calculation formula of Formula (1) or (2).

5. The musical sound signal generation device according to claim 1, wherein the fractional delay block to which both ends of the zeroth delay unit are connected executes an operation of outputting an output of the zeroth delay unit, without any change, and the fractional delay block to which both ends of the second delay unit are connected executes an operation of outputting an input value in each of multiplication operations without any change or with a changed sign as an output value in the multiplication operation, instead of the multiplication operations of multiplying a value of 1 or a value of −1 corresponding to the filter coefficient having a value of 1 which corresponds to the second delay length having a value of 0.

6. An electronic device comprising:

the musical sound signal generation device according to claim 1; and an operator.

7. A musical sound signal generation method comprising:

connecting at least three fractional delay blocks each of which is connected to correspond to one of a plurality of delay units of a delay line and delays an input signal by a second delay length, equal to or less than a first delay length, respectively to a first delay unit which is the delay unit that generates a delay corresponding to a designated tone pitch among the plurality of delay units, a zeroth delay unit corresponding to a preceding stage of the first delay unit among the plurality of delay units, and a second delay unit corresponding to a subsequent stage of the first delay unit among the plurality of delay units, the plurality of delay units being connected in a cascade manner, and each delaying the input signal by the first delay length; and continuously connecting any one of the connected zeroth delay unit and the connected second delay unit to the fractional delay block and connecting at least any one of a new zeroth delay unit and a new second delay unit to at least any one of the fractional delay block other than the fractional delay block connected to a new first delay unit in response to setting any one of the connected zeroth delay unit and the connected second delay unit as the new first delay unit, setting a delay unit in a preceding stage of the new first delay unit as the new zeroth delay unit, and setting a delay unit in a subsequent stage of the new first delay unit as the new second delay unit in accordance with a change in the designated tone pitch.

8. The musical sound signal generation method according to claim 7, further comprising causing each of the at least three fractional delay blocks to operate as an all-pass filter block together with the delay unit corresponding to the fractional delay block.

9. The musical sound signal generation method according to claim 8, further comprising:

setting a filter coefficient corresponding to the second delay length, which is a fractional part of a delay length corresponding to the designated tone pitch, in the all-pass filter block which is the fractional delay block corresponding to the first delay unit, setting filter coefficients having a value of 0 and a value of 1, which correspond to the second delay length having a value of 1 and a value of 0, in the all-pass filter block which is the fractional delay block corresponding to the zeroth delay unit and the all-pass filter block which is the fractional delay block corresponding to the second delay unit, respectively, and outputting an output of the all-pass filter block, which is the fractional delay block corresponding to the first delay unit, as a musical sound signal and a feedback signal to the input of the delay line.

10. The musical sound signal generation method according to claim 7, further comprising:

when a fractional part of the delay length is denoted by 1, setting a coefficient g calculated by calculation represented by a calculation formula of $$g=(1-1)/(1+1) \quad (1)$$

as the filter coefficient corresponding to the second delay length which is the fractional part of the delay length corresponding to the designated tone pitch in a case where the first delay unit is an even-numbered or odd-numbered delay unit, and setting, as the filter coefficient, a coefficient (1−g) calculated by using a coefficient g calculated by calculation represented by a calculation formula of $$g=2\times 1/(1+1) \quad (2)$$

in a case where the first delay unit is an odd-numbered or even-numbered delay unit; and receiving, as an input, the fractional part 1 of the delay length and outputting, as an envelope value, the coefficient g that changes as represented by the calculation formula of Formula (1) or (2).

11. The musical sound signal generation method according to claim 7, wherein the fractional delay block to which both ends of the zeroth delay unit are connected executes an operation of outputting an output of the zeroth delay unit, without any change, and the fractional delay block to which both ends of the second delay unit are connected executes an operation of outputting an input value in each of multiplication operations without any change or with a changed sign as an output value in the multiplication operation, instead of the multiplication operations of multiplying a value of 1 or a value of −1 corresponding to the filter coefficient having a value of 1 which corresponds to the second delay length having a value of 0.

12. A non-transitory computer-readable recording medium storing a program of system, wherein the program is configured to allow a computer in an electronic device:

connecting at least three fractional delay blocks each of which is connected to correspond to one of a plurality of delay units of a delay line and delays an input signal by a second delay length, equal to or less than a first delay length, respectively to a first delay unit which is the delay unit that generates a delay corresponding to a designated tone pitch among the plurality of delay units, a zeroth delay unit corresponding to a preceding stage of the first delay unit among the plurality of delay units, and a second delay unit corresponding to a subsequent stage of the first delay unit among the plurality of delay units, the plurality of delay units being connected in a cascade manner, and each delaying the input signal by the first delay length; and continuously connecting any one of the connected zeroth delay unit and the connected second delay unit to the fractional delay block and connecting at least any one of a new zeroth delay unit and a new second delay unit to at least any one of the fractional delay block other than the fractional delay block connected to a new first delay unit in response to setting any one of the connected zeroth delay unit and the connected second delay unit as the new first delay unit, setting a delay unit in a preceding stage of the new first delay unit as the new zeroth delay unit, and setting a delay unit in a subsequent stage of the new first delay unit as the new second delay unit in accordance with a change in the designated tone pitch.

13. The non-transitory computer-readable recording medium according to claim 12, wherein the program is configured to allow a computer in an electronic device causing each of the at least three fractional delay blocks to operate as an all-pass filter block together with the delay unit corresponding to the fractional delay block.

14. The non-transitory computer-readable recording medium according to claim 12, wherein the program is configured to allow a computer in an electronic device:

setting a filter coefficient corresponding to the second delay length, which is a fractional part of a delay length corresponding to the designated tone pitch, in the all-pass filter block which is the fractional delay block corresponding to the first delay unit;

setting filter coefficients having a value of 0 and a value of 1, which correspond to the second delay length having a value of 1 and a value of 0, in the all-pass filter block which is the fractional delay block corresponding to the zeroth delay unit and the all-pass filter block which is the fractional delay block corresponding to the second delay unit, respectively; and outputting an output of the all-pass filter block, which is the fractional delay block corresponding to the first delay unit, as a musical sound signal and a feedback signal to the input of the delay line.

15. The non-transitory computer-readable recording medium according to claim 12, wherein the program is configured to allow a computer in an electronic device:

when a fractional part of the delay length is denoted by 1, setting a coefficient g calculated by calculation represented by a calculation formula of $$g=(1-1)/(1+1) \quad (1)$$

as the filter coefficient corresponding to the second delay length which is the fractional part of the delay length corresponding to the designated tone pitch in a case where the first delay unit is an even-numbered or odd-numbered delay unit, and setting, as the filter coefficient, a coefficient (1−g) calculated by using a coefficient g calculated by calculation represented by a calculation formula of $$g=2\times 1/(1+1) \quad (2)$$

in a case where the first delay unit is an odd-numbered or even-numbered delay unit; and receiving, as an input, the fractional part 1 of the delay length and outputting, as an envelope value, the coefficient g that changes as represented by the calculation formula of Formula (1) or (2).

16. The non-transitory computer-readable recording medium according to claim 12, wherein the program is configured to allow a computer in an electronic device:

causing the fractional delay block to which both ends of the zeroth delay unit are connected to execute an operation of outputting an output of the zeroth delay unit, without any change; and causing the fractional delay block to which both ends of the second delay unit are connected to execute an operation of outputting an input value in each of multiplication operations without any change or with a changed sign as an output value in the multiplication operation, instead of the multiplication operations of multiplying a value of 1 or a value of −1 corresponding to the filter coefficient having a value of 1 which corresponds to the second delay length having a value of 0.

* * * * *